United States Patent
Kiedaisch et al.

(10) Patent No.: US 10,695,701 B2
(45) Date of Patent: *Jun. 30, 2020

(54) FUEL FILTER

(75) Inventors: Steffi Kiedaisch, Göppingen (DE);
Thorsten Schmid, Remseck (DE);
Norbert Strassenberger, Adlkofen (DE); Chris Sturgess, Korntal (DE);
Andreas Klinser, Ludwigsburg (DE);
Andreas Franz, Ludwigsburg (DE);
Holger Findeisen, Marbach (DE);
Michael Micke, Stuttgart (DE);
Andreas Steuss, Bietigheim-Bissingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 2066 days.

This patent is subject to a terminal disclaimer.

(21) Appl. No.: 11/996,360

(22) PCT Filed: Jul. 21, 2006

(86) PCT No.: PCT/EP2006/064510
§ 371 (c)(1),
(2), (4) Date: Jan. 22, 2008

(87) PCT Pub. No.: WO2007/010037
PCT Pub. Date: Jan. 25, 2007

(65) Prior Publication Data
US 2008/0210618 A1 Sep. 4, 2008

(30) Foreign Application Priority Data

Jul. 22, 2005 (DE) .................. 10 2005 035 003
Sep. 12, 2005 (DE) .................. 20 2005 014 451

(51) Int. Cl.
*B01D 36/00* (2006.01)

(52) U.S. Cl.
CPC ......... *B01D 36/001* (2013.01); *B01D 36/003* (2013.01); *B01D 2201/291* (2013.01);
(Continued)

(58) Field of Classification Search
CPC ............... B01D 36/001; B01D 36/003; B01D 2201/291; B01D 2201/4023; B01D 2201/4084
(Continued)

(56) References Cited

U.S. PATENT DOCUMENTS 2,631,892 A * 3/1953 Czarnecki, Jr. ......... F23D 11/38
239/590.3
2,942,732 A * 6/1960 Edelen .......................... 210/436
(Continued)

FOREIGN PATENT DOCUMENTS

DE 19835525 * 10/1999 ........... B01D 29/114
DE 19835525 C1 * 10/1999 ........... B01D 29/114
(Continued)

*Primary Examiner* — Bobby Ramdhanie
*Assistant Examiner* — Denise R. Anderson
(74) *Attorney, Agent, or Firm* — James Hasselbeck

(57) ABSTRACT

A fuel filter has a housing having an intake and an outlet. A filter element is arranged in the housing such that a filtered area is separated seal-tightly from an unfiltered area. A flow passage is provided between the unfiltered area and the filtered area. A porous filter member closes off the flow passage, wherein the porous filter member is arranged seal-tightly on a wall arranged about the flow passage. The filter element has a filter medium and a geodetically upper and a geodetically lower terminal disks arranged at end faces of the filter medium. The filter medium is connected seal-tightly to the terminal disks. The flow passage is arranged in the geodetically upper terminal disk that forms the wall.

6 Claims, 5 Drawing Sheets

(52) U.S. Cl.
    CPC .............. *B01D 2201/4023* (2013.01); *B01D 2201/4084* (2013.01)

(58) Field of Classification Search
    USPC ........................................ 210/130, 132, 120
    See application file for complete search history.

(56) References Cited

U.S. PATENT DOCUMENTS

| | | | | |
|---|---|---|---|---|
| 4,113,627 | A | * | 9/1978 | Leason .............. B01D 19/0031 |
| | | | | 210/446 |
| 5,413,711 | A | * | 5/1995 | Janik .............................. 210/300 |
| 6,623,631 | B1 | | 9/2003 | Graus et al. |
| 8,287,727 | B2 | * | 10/2012 | Kiedaisch .............. B01D 29/21 |
| | | | | 210/120 |
| 2003/0010689 | A1 | * | 1/2003 | Yano et al. ................... 210/130 |
| 2006/0213827 | A1 | * | 9/2006 | Nozaki ................. B01D 27/06 |
| | | | | 210/437 |

FOREIGN PATENT DOCUMENTS

| | | | |
|---|---|---|---|
| DE | 19835525 C1 | * 10/1999 | ........... B01D 29/114 |
| DE | 19835525 C1 | 10/1999 | |
| WO | 00/47310 | 8/2000 | |

* cited by examiner

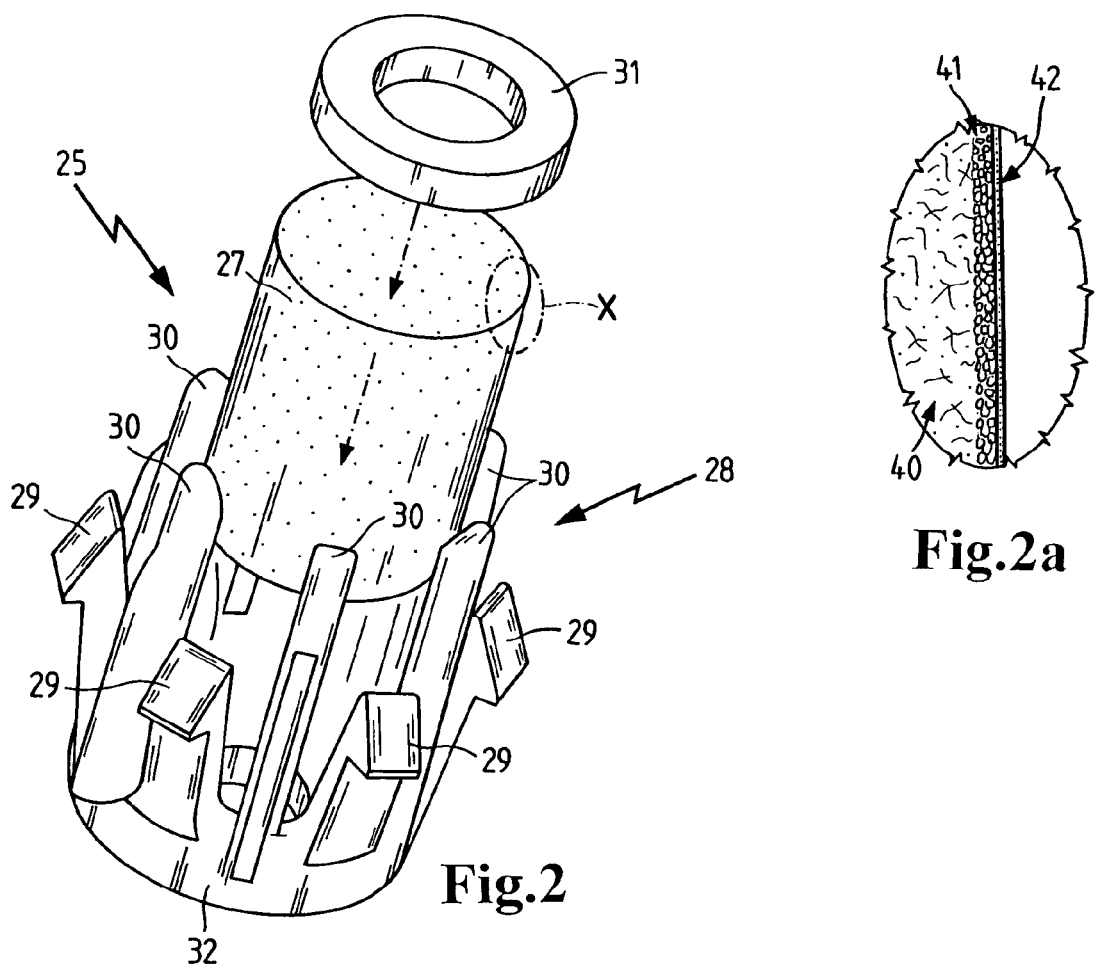
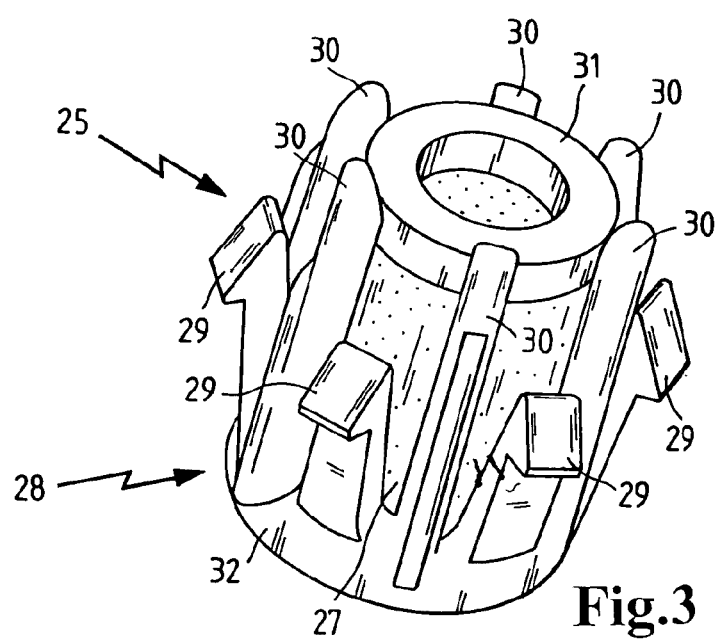

FUEL FILTER

BACKGROUND OF THE INVENTION

The invention relates to a fuel filter, in particular for operation of internal combustion engines of vehicles.

Fuel filters for filtering fuels that operate with pressure action or suction action are known. The fuel filters prevent contaminants that are contained in the fuel from reaching the internal combustion engine. The fuel contains finely dispersed or dissolved air. When operating the fuel filter with suction action, the air is outgased from the fuel. This air collects within the fuel filter at the unfiltered side. Since the air does not pass through the filter medium of the fuel filter, the liquid level in the fuel filter will drop so that the available effective filter surface area is significantly reduced. Moreover, the drop of the liquid level means that only a portion of the filter surface area is utilized for filtration and water separation instead of the entire filter element. For water separation, however, a certain filter surface area that depends on the flow rate is required. When the filter surface area drops below this value because of the dropping liquid level, the water separation action will deteriorate to an unsatisfactory level. Moreover, at the same time, the flow velocity in the filter medium will increase which is disadvantageous for the filtration process. At the same time, the pressure differential between the unfiltered side and the filtered side will increase.

For preventing air from collecting at the unfiltered side different devices, for example, air bores or flow passages have been used. However, in particular in the case of openings provided for air there is the disadvantage that unfiltered fuel can also reach the filtered side.

SUMMARY OF THE INVENTION

It is an object of the invention to provide a fuel filter that operates with suction action without the filter surface area being reduced by the air that is outgased. Moreover, it is to be prevented that unfiltered fuel reaches the filtered side of the filter medium and contaminates the fuel. Moreover, the fuel filter should be producible in a simple and inexpensive way. This object is solved by the fuel filter of the aforementioned kind wherein between the unfiltered area and the filtered area a flow passage is provided, wherein the flow passage is closed off by a porous filter member and wherein the porous filter member matches seal-tightly the wall arranged about the flow passage.

The fuel filter according to the present invention serves for filtering fuel e.g. diesel fuel. In this connection, contaminants are removable from the fuel so that they cannot damage consumers arranged downstream. Preferably, the fuel filter is provided for filtering fuels for internal combustion engines of vehicle in particular when water separation is required. The fuel filter has a housing and a filter element arranged in the housing. The housing has at least one intake and one outlet. Through the intake the fuel to be filtered flows into the housing and through the outlet the filtered fuel exits from the housing. The housing can be made from metal and/or plastic material. Inasmuch as the filter element in the housing is to be exchangeable, the housing must be designed so that it can be opened. In this connection, it is expedient when the housing comprises a container and a cover. The filter element is arranged in the housing in such a way that a filtered area is separated seal-tightly from an unfiltered area. The unfiltered area communicates with the intake and the filtered area communicates with the outlet. Between the unfiltered area and the filtered area, at least one flow passage is provided wherein the flow passage is arranged in a geodetically upper area in the fuel filter. Instead of a single flow passage, several flow passages can also be provided. In this connection, the flow passage can be provided in the housing itself or in the filter element. The filter element comprises preferably a folded and annularly closed filter medium that is sealed off at its end faces by terminal disks. When the flow passage is arranged in the filter element, the flow passage is preferably arranged in the upper terminal disk. When an appropriate pressure differential is present, gases can be guided from the unfiltered side to the filtered side by means of the flow passage. The flow passage is surrounded by a wall wherein the wall can be part of the housing or of the filter element. A porous filter member that is permeable for gases and fuel matches this wall; the filter member is impermeable to contaminants. The filter member can be embodied as a three-dimensional porous body but also as a flat or folded filter paper or nonwoven filter. The filter member can be, for example, glued to the wall, fused thereto or integrally injection-molded with the wall. In this connection, the filter member completely covers the flow passage. The pores of the filter member are designed such that gases that collect within the upper area of the housing can pass at a defined differential pressure through the filter member. When the gasses pass through the filter member, the large gas bubbles can be divided into very small bubbles. Alternatively, the gas bubbles can also pass an aperture or a specially formed edge along which the gas bubbles will pass, where they are split and divided into small bubbles. These small bubbles can then be admixed to the filtered fuel without this having a negative effect on the combustion process. Should no gases be contained in the housing and the fuel comes into contact with the filter member, the fuel that passes through the flow passage is filtered by means of the filter member. Accordingly, no contaminants will pass from the unfiltered side to the filtered side. In order for the gases to pass through the filter member, preferably a higher differential pressure is required than for the passage of the fuel through the filter medium. This differential pressure is generated by a drop of the liquid level in the fuel filter and the thus reduced available filter surface area.

According to a further embodiment of the invention, a seal is provided that has the effect of preventing leakage between the filter member and the wall. In this connection, the seal can be comprised of an elastomer material that is fuel-resistant. For example, the seal can be comprised of NBR or FPM. The resistance is in particular required with regard to diesel fuel, biodiesel and ethanol in order for the seal not to become damaged thus causing leaks. By using an elastic seal, in addition to the sealing action between the wall and the filter member, an axial tolerance compensation is provided so that leakage as a result of manufacturing tolerances is prevented.

It is advantageous when a cage is provided in which the porous filter member is at least partially arranged. Accordingly, the filter member can be inserted into the cage for pre-assembly. In this way, the filter member can be inserted into and attached to the housing in a simple way. The cage is permeable for the gases to be removed as well as for the fuel so that the filter member is designed to allow passage from all sides. This is advantageous because in this way the effective passable surface area of the filter member is especially large.

According to a special configuration of the invention, the cage has webs wherein the webs are designed such that the filter member is secured by means of a press fit. Accordingly, mounting of the filter member in the housing is substantially simplified. According to a further embodiment, the seal is also secured by means of press fit in the cage so that a complete pre-mounted unit comprised of the filter member, the cage, and the seal can be secured within the housing in a single mounting step.

It is particularly advantageous when the cage has snap-on hooks with which the cage can be secured on the wall. In this way, the pre-assembled unit is simply positioned on the wall and mounted by applying slight pressure. For simplified assembly the snap-on hooks and/or the wall can have insertion ramps with which mounting is simplified.

According to a further embodiment of the invention, the cage is comprised of thermoplastic material and is producible by an injection molding process for plastic material. Accordingly, the cage can be produced simply and inexpensively; even complex geometries can be realized.

In another embodiment the filter member is comprised of sintered material, in particular ceramic material. By selection of the material or by processing the pores of the filter member can be affected with regard to their properties. It is advantageous in this connection when the pores are within a range of approximately 50 to 150 micrometers, in particular 80 micrometers, because in this range an optimal gas passage is ensured and the contaminants contained in the fuel cannot pass into the filtered area.

The ceramic filter member can be matched with regard to pore size, porosity, and cell geometry to the requirements in question. In this context, the filter member can be comprised of an open-cell or closed-cell foam. In order to produce the filter member, a blank of foam material can be used which has been processed in order to provide the required geometries. Possible foam materials are, for example, crosslinked polyethylene, PUR ethers, cold foams of HR or CMHR, PUR esters, prepolymer foams, foam rubber, latex foam, melamine resin foam, viscose sponge, PVC foam, copolymer foam, PANA elasturan, polypropylene foam, natural rubber, chloroprene rubber, ethylene propylene diene rubber, nitrile butadiene rubber or styrene butadiene rubber. Any suitable method, for example, sawing, thermo-forming, water jet cutting or laser cutting can be used in this connection. The shaped blank is infiltrated by a suitable suspension of inorganic sinterable particles, e.g., by pouring it on the blank or by immersing the blank in it. Subsequently, the shaped blank is dried in air or under defined conditions with regard to temperature and humidity. After drying, the filter member is sintered thereby forming the pores.

According to another embodiment of the invention, the filter member is cylindrical wherein an end face is arranged above the passage. The circumferential surface and the other end face are in contact with the unfiltered area so that the filter member is suitable for axial flow and radial flow.

BRIEF DESCRIPTION OF THE DRAWINGS

Further details of the invention will be explained in the following with the aid of the Figures. It is shown in:

FIG. 2 a venting unit in exploded view;
FIG. 2A a detail of the filter member according to FIG. 2;
FIG. 3 a venting unit according to FIG. 2 in the preassembled state.

EMBODIMENT(S) OF THE INVENTION

Figure 1:
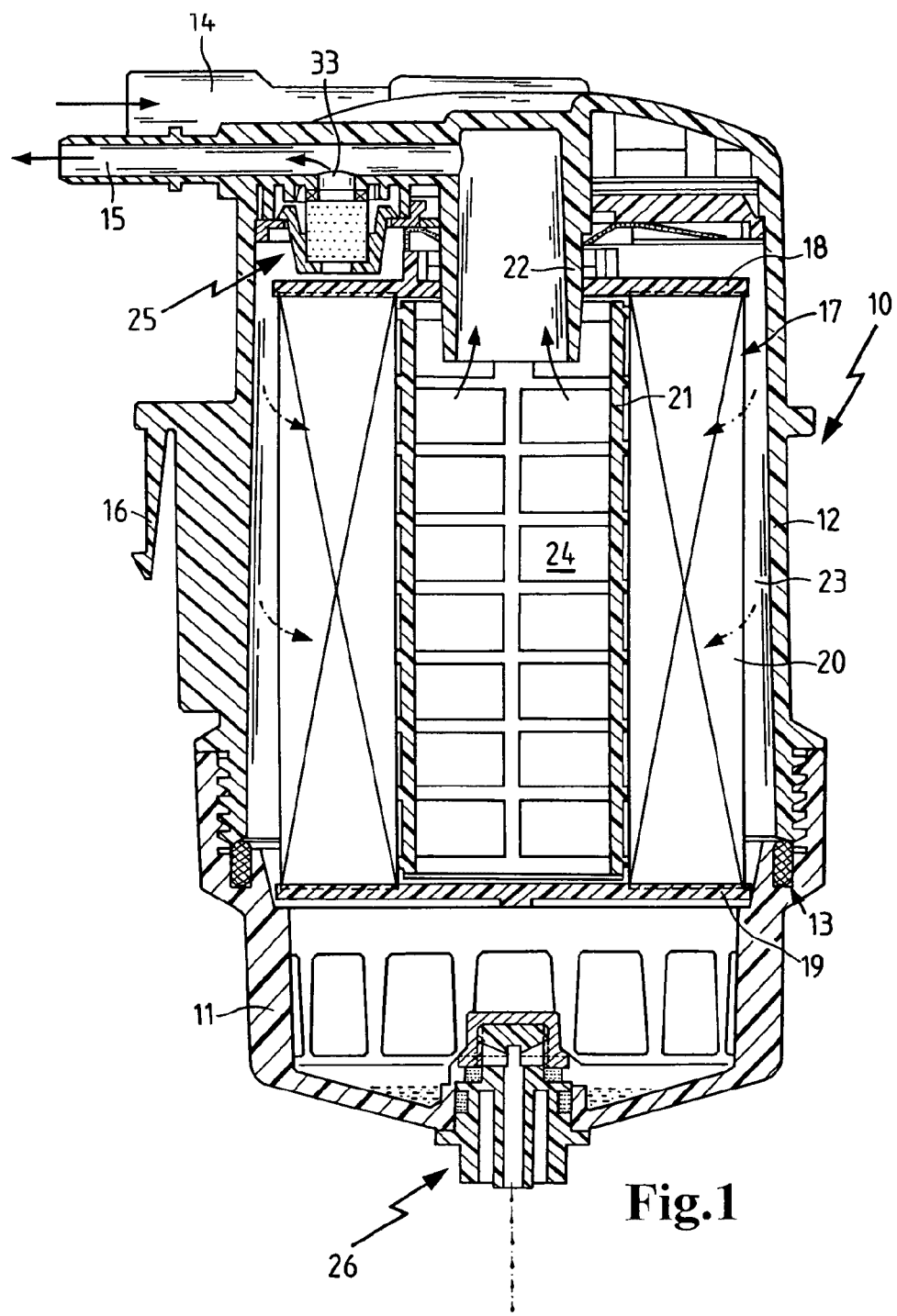
FIG. 1 a fuel filter in section.

In FIG. 1, a filter for liquids is shown in section. The filter for liquids has a two-part housing 10 that is comprised of plastic material. The housing 10 is formed by a housing cover 11 and a housing cup 12 wherein the housing cover 11 is screwed onto the housing cup 12 in a seal-tight manner. For this purpose, a seal 13 is provided in the area of the screw connection. The housing cup 12 is designed such that a fuel intake 14 and a fuel outlet 15 are integrally formed therewith. Moreover, on the housing cup 12 a fasting clip 16 is arranged with which the housing 10 can be secured, for example, in the motor compartment of a vehicle. Within the housing 10 a filter element 17 is arranged that is provided with a top terminal disk 18 and a bottom terminal disk 19. Between the terminal disks 18, 19 a zigzag-folded filter medium 20 extends. The filter medium 20 is annularly closed wherein within the closed filter medium 20 a support body 21 is arranged. The support body 21 prevents that the filter medium 20 at greater pressures or high flow rates becomes deformed or damaged. With its top terminal disk 18 the filter element 17 is seal-tightly pushed onto an outlet bush 22. The outlet bush 22 is in communication with a fuel outlet 15 wherein the bush 22 is also formed as an integral part of the housing cup 12. By means of the filter element 17, an unfiltered area 23 is seal-tightly separated from the filtered area 24 within the housing 10. The unfiltered area 23 is formed between the filter element 17 and the housing 10. The filtered area 24 is arranged within the filter element 17. In the geodetically upper area of the housing cup 12 a venting unit 25 is arranged which will be explained in detail with the aid of the following Figures. In the geodetically lower area of the housing 10 that is formed by the housing cover 11 a water outlet 26 is arranged. The fuel to be filtered flows through the fuel intake 14 into the unfiltered area 23 of the housing 10. When passing through the filter medium 20, the water contained within the fuel is separated and sinks to the lower area of the housing 10. Here the water is collected above the water outlet 26. The filtered fuel passes through the filter medium into the filtered area 24 from where the fuel reaches the fuel outlet 15 and exits from the fuel filter. Upon operation of the fuel filter in suction operation, gases dissolved in the fuel will be outgased. These gases collect in the upper area of the housing 10 and form a gas bubble. In order for the gas bubble not to fill the entire interior volume of the housing 10 over time, the venting unit 25 is provided in the upper area. The gases pass through this venting unit 25 and are admixed to the filtered fuel. In this connection, the gases are divided into extremely small air bubbles so that they do not negatively affect the subsequent combustion process. In FIG. 2, the venting unit 25 is shown in an exploded view. The venting unit 25 has a porous cylinder-shaped filter member 27 that is comprised of sintered ceramic material. The pores of the filter member 27 are designed such that the gases can pass through and become finely divided. Moreover, dirt particles contained in the fuel cannot pass from the unfiltered area 23 to the filtered area 24. The filter member 27 is inserted into a cage 28 with which the filter member 27 can be secured within the housing 10 (according to FIG. 1). For this purpose, the cage 28 has snap-on hooks 29 which are distributed about the circumference. Moreover, the cage 28 has fixation webs 30 that extend in the axial direction and receive the filter member 27. In this connection, the interior volume which is defined by the fixation webs 30 is somewhat smaller than the outer contour of the filter member 27 so that the filter member 27 is secured with press fit in the cage 28. The snap-on hooks 29 and the fixation webs 30 extend in the axial direction away from a circular ring segment 32 that is passable for the gas in its center area. The venting unit 25 comprises moreover a circular ring-shaped seal 31 which is comprised of a fuel-resistant elastomer. The seal 31 has an outer diameter that matches essentially the diameter of the filter member 27.

In FIG. 2 a detailed view of the filter member 27 is illustrated. The filter member has a support structure 40 comprised of a ceramitized or metalized foam material. This foam is provided for smoothing the surface or for decreasing the pore size with a porous infiltrated area 41. An uppermost layer as a functional layer or separating layer 42 is applied onto this area 41.

In FIG. 3, the venting unit 25 according to FIG. 2 is illustrated in the preassembled state. Components that correspond to those of FIG. 2 are identified with same reference numerals. The venting unit, on the one hand, can be preassembled easily and, on the other hand, mounted easily in the housing.

Figure 4:
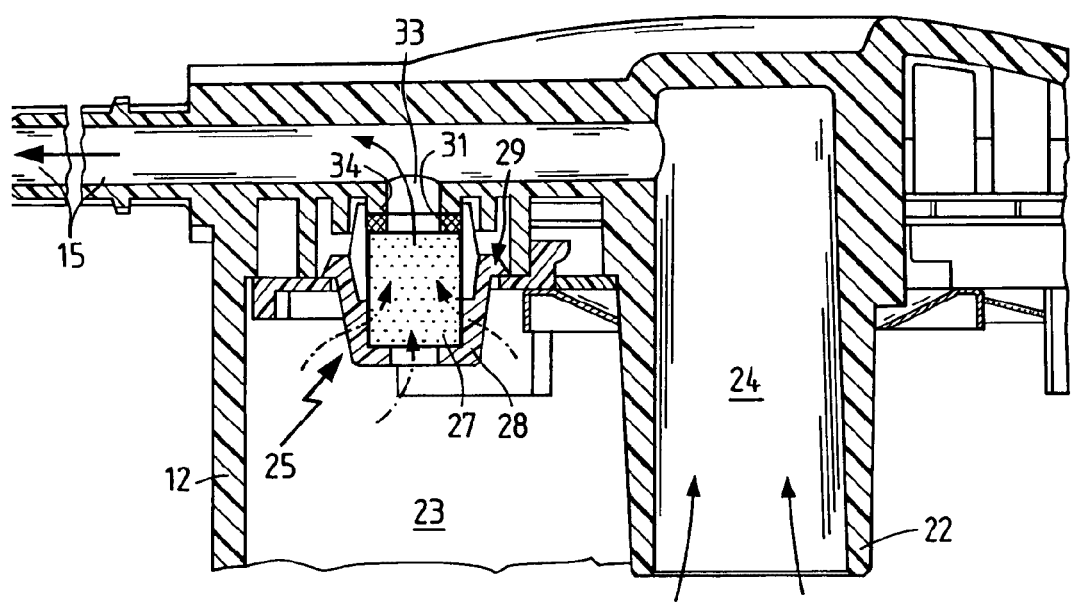
FIG. 4 a detail of the fuel filter according to FIG. 1.

In FIG. 4, a detail of the fuel filter according to FIG. 1 is shown in section. Components corresponding to those of FIG. 1 or FIG. 2 are identified with same reference numerals. The venting unit 25 is secured with snap-on hooks 29 on the housing 12. Between the unfiltered area 23 and the fuel outlet 15 a flow passage 33 is arranged that is covered by the filter member 27. The flow passage 33 is surrounded by a sealing projection 34 on which the seal 31 rests and, in this way, prevents leakage between the filter member 27 and the housing 10. Moreover, the seal 31 serves as an axial tolerance compensation so that mounting of the snap-on hoax 29 is enabled without them subsequently having too much play.

Figure 5:
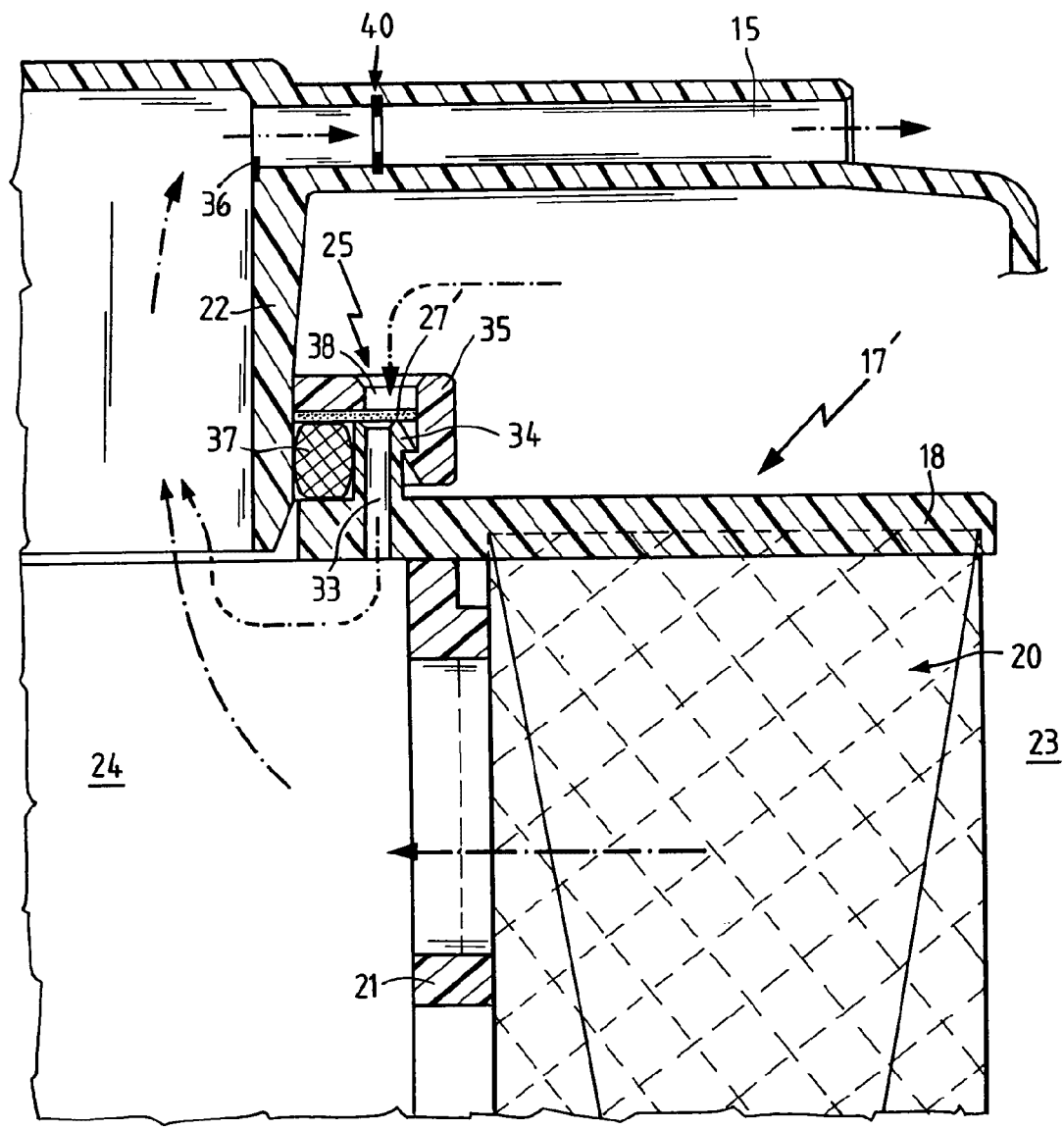
FIG. 5 a schematic illustration of a detail of a fuel filter.

In FIG. 5, a section of an alternatively designed fuel filter is illustrated. Components that correspond to those of the preceding Figures are identified with same reference numerals. The fuel filter has a filter element 17' that is comprised of a zigzag-folded filter medium 28 and is arranged concentrically about the outlet bush 22. The filter medium 20 is sealed off at its end face by a terminal disk 18. The fuel flows in the direction of the arrow from the unfiltered area 23 through the filter medium 28 into the filtered area 24 from where the fuel is supplied through the outlet bush 22 to the fuel outlet 15. Above the filter element there is also fuel that is not yet filtered and possibly air is present that has been outgased from the fuel. This air or gases collect within the geodetically upper area above the terminal disk 18 in the fuel filter. In order to transfer these gases into the filtered area 24, the terminal disk 18 has one or several flow passages 33. These flow passages 33 are covered by the filter member 27' wherein the filter member 27' is designed as a filter paper ring. Alternatively, the filter member 27' can also be comprised of other media, for example, a ceramic filter foam. The filter paper ring has in this embodiment the same properties as the filter medium 20 and is comprised preferably of the same material. For fixation of the filter paper ring above the flow passages 33 a securing ring 35 is provided. The securing ring 35 is designed similar to a union nut and is connected fixedly such to the terminal disk 18 that slipping of the filter paper ring 27' is prevented. According to another embodiment, the securing ring 35 can also be secured by being snapped in place on the terminal disk 18, by gluing, or by fusing so that a simple assembly is possible. Moreover, the securing ring 35 serves for positioning the seal 37 which is provided for sealing the filter element 17' on the outlet bush 22. In this connection, the seal 37 is clamped at three sides between the terminal disk 18, its integral flow passage 33, and the securing ring 35. The filter paper ring 27' is air-permeable as well as liquid-permeable. This means that a minimal liquid flow passes in the direction of the dash-dotted arrow through the flow passage 33 of the terminal disk 18.

At the same time, air that is located at the unfiltered liquid side passes through the flow passage 33 and can exit from the filtered area 24 via the fuel outlet 15. In this way, a continuous removal of gases from the fuel filter is enabled. Since the filter member 27' is arranged directly on the filter element 17', it is exchanged every time a filter element is exchanged so that clogging of the pores by overextended use of the fuel filter is prevented. The space required for outgasing can thus be reduced because no reserves for the gradual blocking of the pores must be provided. Inasmuch as the air in the filtered area 24 forms large bubbles, it is expedient to divide these bubbles. This division is carried out by means of the edge 36 which is arranged in the fuel outlet 15. The air bubbles pass along this edge and are thus split. As an alternative or in addition to the edge 36, it is also possible to provide an aperture 40 which is arranged in the fuel outlet 15. In the upper section view of FIG. 6, the terminal disk 18 and the securing ring 35 are illustrated in a plan view. Components of FIG. 6 corresponding to those of FIG. 5 are identified with the same reference numerals. The securing ring 35 has several passages 38 that are configured as ports or bores.

Figure 6:
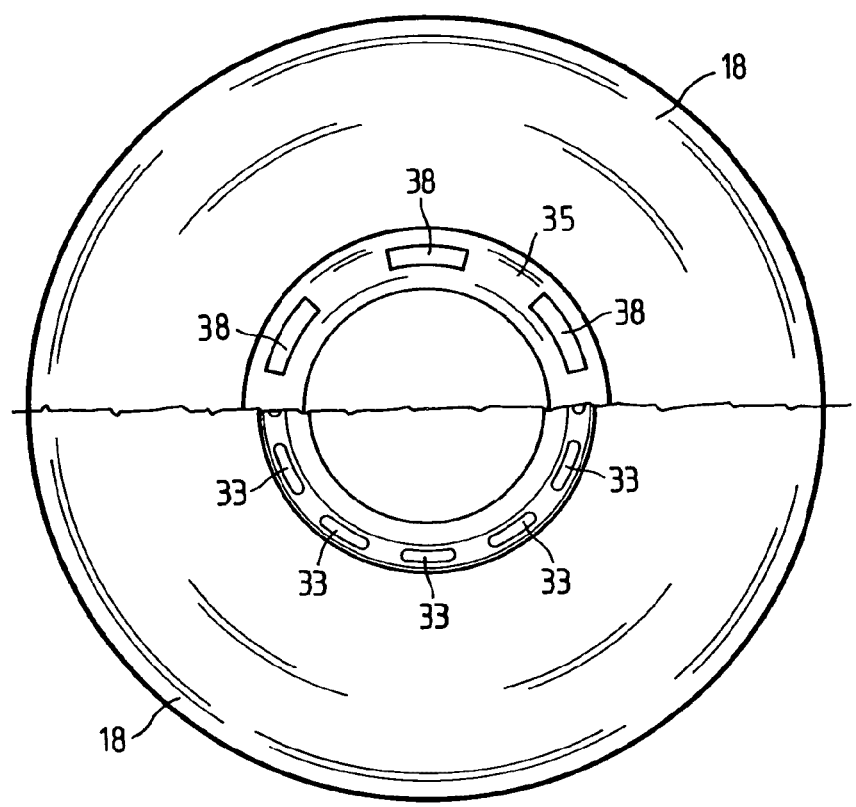
FIG. 6 a plan view onto the terminal disk of the fuel filter according to FIG. 5.

In the lower section of FIG. 6 the terminal disk 18 is illustrated without the securing ring 35 being mounted. This shows that the terminal disk 18 has several flow passages 33 that are arranged on a circle in uniform distribution. The position and size of the flow passages 33 and the passages 38 are matched to one another in such a way that air can pass from the flow passages 33 to the passages 38 in any position of the securing ring 35 on the terminal disk 18.

What is claimed is:
1. Fuel filter comprising:
a housing having an intake and an outlet;
a filter element arranged in the housing such that a filtered area is separated seal-tightly from an unfiltered area, the filter element including
an annularly closed filter medium that is fluid flow permeable and having an upper axial end face and a lower axial end face, the annularly closed filter medium filtering fluid flowing through the annularly closed filter medium; and
an upper and a lower terminal disk connected seal-tightly onto the upper and lower axial end faces, respectively, of the annularly closed filter medium, the upper and lower terminal disks seal off the upper and lower axial end faces, respectively, of the annularly closed filter medium from fluid flow,
the upper and lower terminal disks connected seal-tightly onto respective upper and lower axial end faces of the annularly closed filter medium, such that the annularly closed filter medium is sealed off from fluid flow at its upper and lower axial end faces by the upper and lower terminal disks,
wherein the upper terminal disk includes:
a fuel outlet opening in the upper terminal disk through which a fuel stream of filtered fuel exits an interior of the filter element, the fuel outlet opening fluidically connected to the outlet of the housing,
an annular sealing projection arranged on an axially outer side of the upper terminal disk, spaced radially outwardly away from the fuel outlet opening, and circumferentially encircling the fuel outlet opening of the upper terminal disk, the annular sealing projection projecting axially outwardly away from the upper terminal disk, the annular sealing projection having a plurality of axial flow openings formed into the annular sealing projection and distributed circularly about a circumference of the fuel outlet opening, the plurality of axial flow openings having a first end opening into the interior of the filter element, a porous filter member arranged on the annular sealing projection and covering the plurality of axial flow openings, and filtering fluid flowing through the plurality of axial flow openings;

a securing ring arranged on the annular sealing projection and encircling the fuel outlet opening;

wherein the securing ring has a plurality of securing ring openings extending therethrough, the plurality of securing ring openings forming a continuation of the plurality of axial flow openings of the annular sealing projection, wherein the porous filter member is sandwiched between the securing ring and the annular sealing projection.

2. Fuel filter according to claim 1, wherein the porous filter member is comprised of the same material as the annularly closed filter medium of the filter element.

3. Fuel filter according to claim 1, wherein the porous filter member is comprised of a sintered material.

4. Fuel filter according to claim 3, wherein the sintered material is a ceramic material.

5. The fuel filter according to claim 1,
wherein the outlet of the housing includes an outlet bush projecting into the interior of the filter element through the annular sealing projection of the upper terminal disk;
wherein the upper terminal disk includes a seal ring, the seal ring compressed at opposing axial sides between the upper terminal disk and the securing ring;
wherein the securing ring seals against the annular sealing projection on a radially outer side and the outlet bush on an opposing radially inner side.

6. A filter element arrange in a filter housing such that a filtered area is separated seal-tightly from an unfiltered area, the filter element is annularly closed, the filter element including an annularly closed filter medium that is fluid flow permeable and having an upper axial end face and a lower axial end face, the annularly closed filter medium filtering fluid flowing through the annularly closed filter medium; and an upper and a lower terminal disk connected seal-tightly onto the upper and lower axial end faces, respectively, of the annularly closed filter medium, the upper and lower terminal disks seal off the upper and lower axial end faces, respectively, of the annularly closed filter medium from fluid flow, wherein the upper terminal disk includes:
a fuel outlet opening in the upper terminal disk through which a fuel stream of filtered fuel exits an interior of the filter element;

an annular sealing projection arranged on an axially outer side of the upper terminal disk, spaced radially outwardly away from the fuel outlet opening, and circumferentially encircling the fuel outlet opening of the upper terminal disk, the annular sealing projection projecting axially outwardly away from the upper terminal disk, the annular sealing projection having a plurality of axial flow openings formed into the annular sealing projection and distributed circularly about a circumference of the fuel outlet opening, the plurality of axial flow openings having a first end opening into the interior of the filter element, and a porous filter member arranged on the annular sealing projection and covering the plurality of axial flow openings, and filtering fluid flowing through the plurality of axial flow openings, a securing ring arranged on the annular sealing projection and encircling the fuel outlet opening;

wherein the securing ring has a plurality of securing ring openings extending therethrough, the plurality of securing ring openings forming a continuation of the plurality of axial flow openings of the annular sealing projection, wherein the porous filter member is sandwiched between the securing ring and the annular sealing projection.

* * * * *